Oct. 7, 1958     M. J. FOLEY ET AL     2,855,518
APPARATUS FOR MEASURING THE THICKNESS OF
A METALLIC COATING ON A STRIP
OF BASE METAL

Filed Dec. 23, 1954     3 Sheets-Sheet 1

INVENTORS.
MATTHEW J. FOLEY
AND CHARLES H. PERRINE,
BY

ATTORNEYS.

Oct. 7, 1958     M. J. FOLEY ET AL     2,855,518
APPARATUS FOR MEASURING THE THICKNESS OF
A METALLIC COATING ON A STRIP
OF BASE METAL

Filed Dec. 23, 1954     3 Sheets-Sheet 2

INVENTORS.
MATTHEW J. FOLEY
AND CHARLES H. PERRINE,
BY

ATTORNEYS.

Oct. 7, 1958    M. J. FOLEY ET AL    2,855,518
APPARATUS FOR MEASURING THE THICKNESS OF
A METALLIC COATING ON A STRIP
OF BASE METAL

Filed Dec. 23, 1954    3 Sheets-Sheet 3

INVENTORS.
MATTHEW J. FOLEY
AND CHARLES H. PERRINE,
BY
ATTORNEYS.

United States Patent Office 2,855,518
Patented Oct. 7, 1958

2,855,518

APPARATUS FOR MEASURING THE THICKNESS OF A METALLIC COATING ON A STRIP OF BASE METAL

Matthew J. Foley, Middletown, and Charles H. Perrine, Lebanon, Ohio, assignors to Armco Steel Corporation, Middletown, Ohio, a corporation of Ohio Application December 23, 1954, Serial No. 477,182

14 Claims. (Cl. 250—52)

This invention relates to an apparatus for measuring the thickness of a metallic coating on a strip of base metal. More particularly, it relates to an apparatus involving a so-called beta ray back scattering gauge. The beta ray back scattering gauge projects beta rays onto the strip surface and the beta rays are diffusely reflected therefrom and the reflected beta rays are measured by a meter.

By means of a beta ray back scattering gauge, thickness of a metallic coating such as zinc or aluminum on a strip of steel may be determined very accurately. However, in order that the readings be accurate and consistent, it is necessary that the area being scanned any given instant be smooth, i. e. free from ripples and defects such as coil breaks and kinks, and it is also necessary that the distance between the strip and the gauge be reasonably constant.

If the above requirements are met, a strip of metal coming off a coating line at relatively high speeds can be continuously scanned on each side and a record of the coating thickness along the length of the strip may be obtained. Such a record, which is substantially instantaneous, makes it possible for the operator to control the line in various ways familiar to those skilled in the art if the coating is too heavy or too light or non-uniform on the two sides of the strip.

With the foregoing considerations in mind, it is an object of the present invention to provide an apparatus for measuring the thickness of coating on a strip of base metal which fulfills the requirements outlined above.

It is another object of the invention to provide an apparatus which will continuously present the strip to the gauge in smooth ripple-free condition and at a substantially constant distance from the gauge.

These and other objects of the invention which will be described in more detail hereinafter or which will become apparent to one skilled in the art upon reading these specifications, we accomplish by that certain construction and arrangement of parts of which we shall now describe certain exemplary embodiments.

Reference is made to the drawings forming a part hereof and in which.

Figures 3 to 8, inclusive, are fragmentary semi-diagrammatic representations of various other modifications.

Briefly, in the practice of our invention, we cause the coated strip to pass the gauge on a curve of large radius convexly disposed toward the gauge by one of a number of means as will be described in more detail hereinafter. If it is desired to maintain an existing pass line, or if the space situation requires a substantially linear pass line, we find that in order for the strip in the region of the gauge to be free of ripples or kinks which would disturb the geometry of the apparatus, it is necessary to cause the strip to undergo a double reverse curvature. For example, if the gauge is downwardly directed at the upper side of a strip traveling in a generally horizontal path, the strip must undergo an upward curvature, a downward curvature and again an upward curvature, with the gauge directed at the central convex element of the double reverse curve. It will be understood that if space considerations make it possible, a single curve may be used for each gauge.

We find, furthermore, that the curve must be of large radius, particularly if the strip has undergone plastic deformation, so that coil set has been introduced.

For example, when coated strip comes out of a coating pot and is caused to change direction over a roll while it is still hot, it is subjected to what is known as plastic deformation and it becomes subject to what is known as coil set. We find that strip which has been subject to plastic deformation can be safely subjected to a curved path without coil breaks developing, which coil breaks would show up as ripples or kinks, if the radius of curvature is at least about 1,000 times the thickness of the strip.

If the strip has not been subjected to plastic deformation, we find that the strip may safely be subjected to a curvature having a radius of at least about 500 times the thickness of the strip.

In undergoing the double reverse curvature hereinbefore referred to, the requirements as to radius of curvature set forth must be observed for all of the curves. The maximum radius of curvature which will still give the desired flattening over the measuring area is not critical, but will depend somewhat on the degree of unflatness of the strip. Since conservation of space generally dictates the use of as small a radius as possible, we prefer to use a value approaching the limiting minimum radius given above. This provides sufficient curvature to flatten adequately most variations in strip flatness encountered in commercial practice.

Since an installation in an existing line will be, for the time being, the more frequent use of this invention, we shall describe it with the double reverse curve mentioned above.

Figure 1:
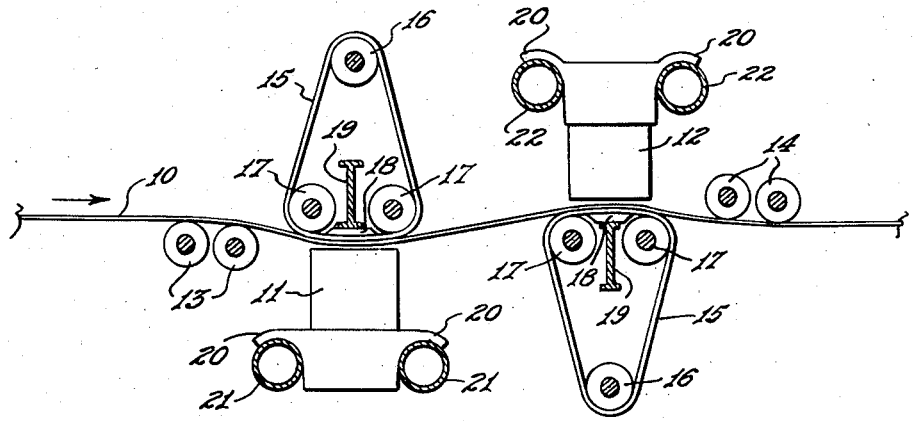
Figure 1 shows somewhat diagrammatically one embodiment of the invention.

Referring more specifically to Figure 1, a coated strip under ordinary processing tension is shown at 10, 11 indicates a gauge of the type discussed above for scanning the underside of the strip, and 12 represents a similar gauge for scanning the upper side of the strip.

It will be noted that the strip 10, as it passes the gauge 11, is downwardly convexly disposed and that as it passes the gauge 12 it is upwardly convexly disposed. Rollers 13 support the strip as it is subjected to a slight downward curvature and rollers 14 cause the strip to be deflected slightly upwardly and back into its original pass line. The particular means for producing the convexity opposite the respective gauges comprise endless belts 15 passing around rollers 16 and the pairs of rollers 17 between which is provided a shoe 18 of the required curvature mounted upon a suitable structural element 19. The assemblies comprising the members 15 to 19 inclusive are fixed and they define the convexity curved path of the strip in the region of the gauge.

The gauges 11 and 12 themselves are supported by means of hanger elements 20 upon the transverse rails 21 and 22. Means (not shown) are provided for traversing the gauges 11, 12 along the rails 21 and 22 respectively, so that readings may be obtained across the entire width of the strip.

Means are also provided (not shown) for causing the gauges to make a reading traverse in one direction and a rapid traverse return.

Other refinements which do not constitute a part of the present invention involve calibrating means for the gauges beyond the edge of the strip, means for causing the gauges to travel beyond the edge of the strip so as to be out of the way at such times as a weld between succeeding pieces of strip approaches the gauging station and to produce a calibration of the gauges incident to their travel beyond the edge of the strip.

Figure 2:
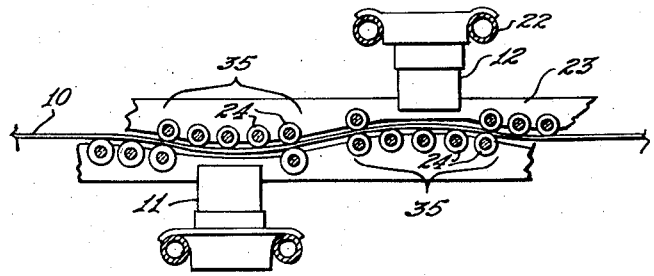
Figure 2 is a similar diagrammatic representation of a modification.

In Figure 2, the arrangement is similar to Figure 1 except that instead of the endless belt structure 15 to 19 inclusive, sets of basket rolls 35 are utilized. These basket rolls are rolls of relatively small diameter which are disposed in a framework 23 with their axes parallel and their surfaces tangent internally to a concave smooth curve having no element of sharper curvature than a circle of large radius, as described above. We find that if the individual rolls 24, which make up the basket rolls 35, are of such size that their axes may be spaced closely enough together, the strip will make substantially line contact with each of the rolls 24 and will actually conform to the curvature of a circular element tangent internally to the rolls 24 of a set. In order, therefore, that a basket roll 35 which produces the same effective curvature as a single large roll having a radius of curvature such that the respective rolls 24 would all be internally tangent to an arc drawn on the large radius, radii of said arc drawn through the axes of adjacent rolls should subtend an angle not in excess of 4½°.

Actually, therefore, the structure of Figure 2 may be considered identical to that of Figure 1 except that basket rolls have been substituted for the endless belts. It will be understood similarly that rolls of very large diameter could be substituted for the belts and the basket rolls within the scope of the invention. Also the basket rolls, or the curved shoes used with the endless belts, could be tangent internally to any smooth curve other than an arc of a circle, provided the radius of curvature imposed upon the strip at the most sharply curved point does not exceed that set forth.

Where strip of different thicknesses is treated in a coating line and where it is undesirable to make adjustments to the gauge structure, it is desirable to insure that the surface of strip toward the gauge be maintained at a constant distance from the gauge. Various ways in which this may be accomplished are disclosed in Figures 3 to 8 inclusive. In these figures it will be understood that we have shown only the gauge for scanning the upper surface of the strip but that in each case the structure would be duplicated for the lower side of the strip in an inverted manner if each surface is to be examined.

Figure 3:
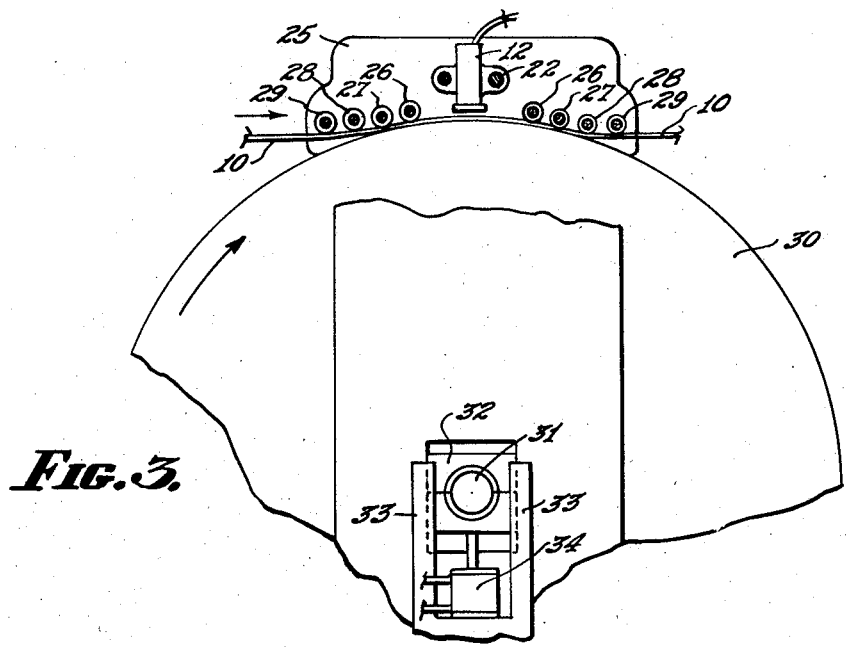

Thus, in Figure 3 the gauge is shown at 12 mounted upon rails 22 which are fixed in a framework 25 in which the rollers 26, 27, 28 and 29 are mounted. These rollers are arranged to produce the desired double reverse curvature in cooperation with the very large roll 30, which will have preferably a radius at least 1,000 times the thickness of the strip although its radius may be only 500 times the thickness if there has been no plastic deformation. The roll 30 is mounted upon a shaft 31 which in turn is mounted in blocks 32 guided in ways 33 so that the roll may be thrust upwardly against the positioning rolls 26 by means of a hydraulic or air cylinder 34 or a spring. It will be noted that since the position of the gauge 12 and the rolls 26 is fixed and the roll 30 is upwardly urged against the fixed rolls 26, it will be the distance between the upper surface of the strip 10 and the gauge 12 which will be maintained constant. If a thicker strip is being gauged, the roll 30 will simply ride slightly lower.

Because the roll 30 would have to be of such great size, it is preferable to utilize an endless belt arrangement similar to that of Figure 1, or a basket roll arrangement similar to that of Figure 2. Such arrangements are shown respectively in Figures 4 and 5. In each case, positioning rolls 26 are secured in fixed relation to the gauge 12 and the strip 10 is urged against the positioning rolls by means of the belt structure of Figure 4 or the basket structure of Figure 5 by means of a hydraulic or air cylinder 34 or by means of a spring as described above.

Figure 6:
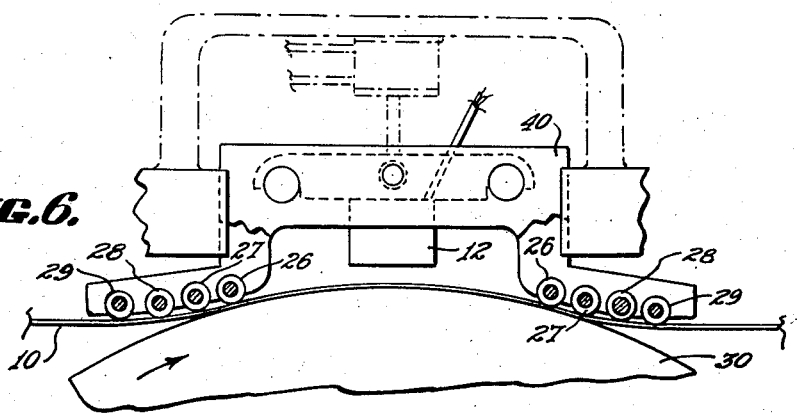

In Figure 6 another embodiment is shown wherein the strip 10 is curved over a large roll 30 similar to that of Figure 3 but wherein the gauge 12 is carried on a framework 40 provided with the rolls 26, 27, 28 and 29, so that the entire framework 40 carrying the gauge 12 actually rides on the strip 10 pressing it against the roll 30. The rolls 26 support the entire frame structure 40.

Figure 7:
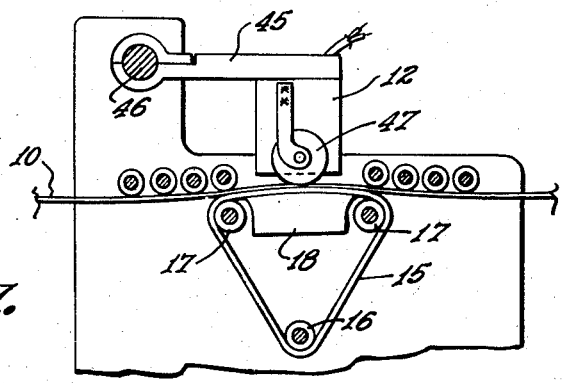
Figure 8:
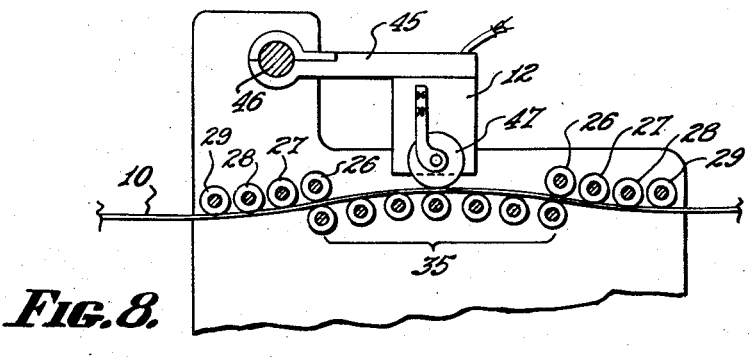

In Figures 7 and 8, arrangements are shown wherein the gauge 12 is mounted upon a sort of outrigger 45 which is pivotally mounted upon a bar 46. A caster 47 is provided to ride on the strip. In the embodiment of Figures 7 and 8, the belt structure 15 to 18 inclusive, or the basket 35 may be fixed if desired and since the roller 47 rides on the strip, the distance between the upper surface of the strip and the gauge will remain constant.

Figures 4, 5:
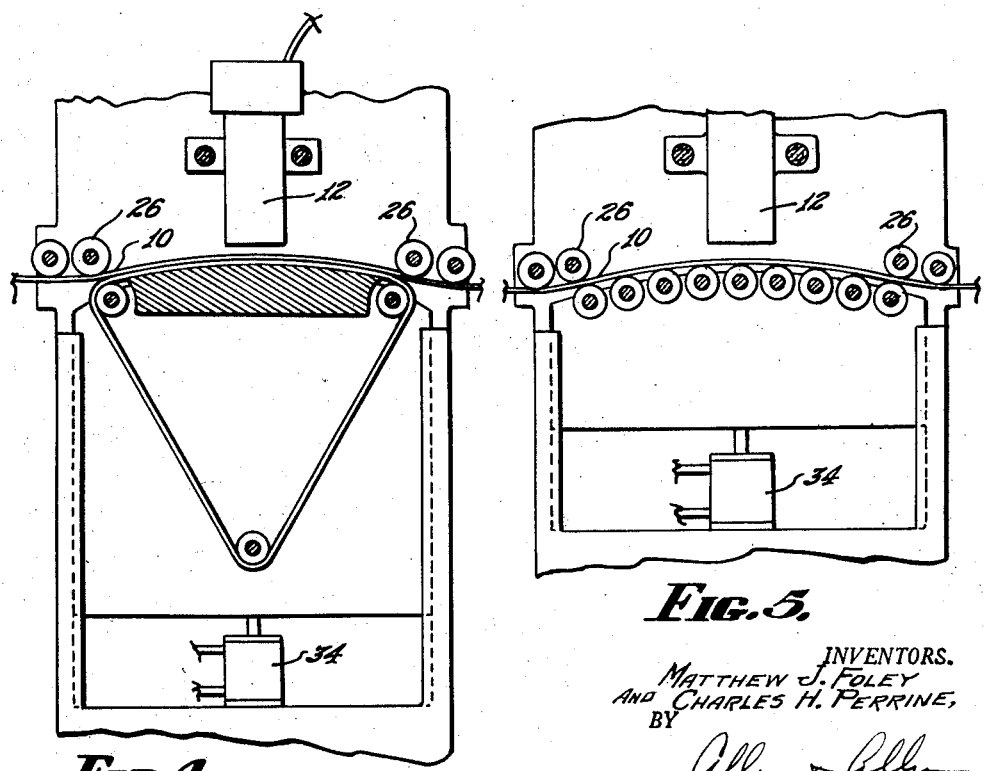

Insofar as our invention is concerned, it will be understood that theoretically the belt structure of Figures 1, 4 and 7 and the large roll structure of Figures 3 and 6, and the basket roll structure of Figures 2, 5 and 8 are equivalent. From the practical standpoint, the large roll structure has the disadvantage of space requirements and cost of such a large roll. The belt structure, while very much less expensive, is subject to the disadvantage that the belts wear out and we, therefore, consider the basket roll structure the most desirable, being reasonably inexpensive and not requiring continuous maintenance.

It will be understood that there is a minimum peripheral contact required with the means enforcing the curvature. Where a large cylindrical roll or a belt is used, this minimum has not been exactly determined. In actual practice, the beta ray gauge requires a ripple-free spot approximately five inches in diameter and it has been determined that if the specifications as to radius of curvature are complied with, an arc of contact sufficient to provide a large enough spot for the gauge is well above the minimum required to produce freedom from ripples.

Where a roll basket is used, the situation is somewhat different in that a minimum of three basket rolls, spaced as above set forth, is required to give the effect of a single large diameter roll. Again, if the requirements as to radius of curvature are observed and a minimum of three basket rolls is provided, a ripple-free spot of adequate dimensions will result.

It will be understood that numerous modifications may be made without departing from the spirit of our invention and we therefore do not intend to limit ourselves otherwise than as set forth in the claims which follow.

Having now fully described our invention, what we claim as new and desire to secure by Letters Patent is:

1. In an apparatus for measuring the thickness of a metallic coating on a strip of base metal by the diffuse reflection of beta rays therefrom, a meter for measuring the reflection of said rays, means enforcing upon said strip a curved path, the convexity of which is disposed adjacent said meter, and means for maintaining the locus of said path at a fixed distance from said meter.

2. In an apparatus for measuring the thickness of a metallic coating on a strip of base metal by the diffuse reflection of beta rays therefrom, a meter for measuring the reflection of said rays, means enforcing upon said strip a curved path, the convexity of which is disposed adjacent said meter, and the radius of curvature of any element of said curve being at least 500 times the maximum thickness of the said strip, and means for maintaining the locus of said path at a fixed distance from said meter.

3. In an apparatus for measuring the thickness of a metallic coating on a strip of base metal, which has been subjected to plastic deformation, by the diffuse reflection of beta rays therefrom, a meter for measuring the reflection of said rays, means enforcing upon said strip a curved path, the convexity of which is disposed adjacent said meter, and the radius of curvature of said curve being at least 1,000 times the maximum thickness of said strip, and means for maintaining the locus of said path at a fixed distance from said meter.

4. In an apparatus for measuring the thickness of a metallic coating on a strip of base metal by the diffuse reflection of beta rays therefrom, a meter for measuring the reflection of said rays, means enforcing upon said strip a curved path, the convexity of which is disposed adjacent said meter, and the radius of curvature of said curve at any point being at least 500 times the maximum thickness of the said strip, and means for maintaining the locus of said path, with reference to the side of the strip remote from said meter, at a fixed distance from said meter.

5. In an apparatus for measuring the thickness of a metallic coating on a strip of base metal by the diffuse reflection of beta rays therefrom, a meter for measuring the reflection of said rays, means enforcing upon said strip a curved path, the convexity of which is disposed adjacent said meter, and the radius of curvature of said curve at any point being at least 500 times the maximum thickness of the said strip, and means for maintaining the locus of said path, with reference to the side of the strip toward said meter, at a fixed distance from said meter.

6. An apparatus according to claim 2, wherein said enforcing means comprises a cylindrical roll rotatable on a fixed axis and producing said convexity, and other rolls bearing against said strip from the opposite side on either side of said meter to induce a double reverse curvature.

7. An apparatus according to claim 2, wherein said enforcing means comprises an endless belt, means causing said belt to move in a fixed smoothly curved path adjacent said meter to produce said convexity, and means bearing against said strip from the opposite side on either side of said meter to induce a double reverse curvature.

8. An apparatus according to claim 2, wherein said enforcing means comprises a fixed frame, a plurality of small diameter rolls mounted in said frame with their axes parallel and disposed on the arc of a circle having substantially the said radius of curvature, the spacing between said rolls being such that radii of said curvature drawn through axes of adjacent rolls subtend an angle not in excess of 4½°.

9. An apparatus according to claim 2, wherein said enforcing means comprises a fixed frame supporting at least three small diameter rolls with their axes parallel and their surfaces tangent internally to a smooth curve having a curvature having no element sharper at any point than said radius of curvature.

10. Apparatus according to claim 2, wherein said last named means comprises fixed positioning rolls on either side of said meter, and means for urging said enforcing means against said positioning rolls.

11. Apparatus according to claim 10, wherein said enforcing means includes a large diameter roll for producing said convexity.

12. Apparatus according to claim 10, wherein said enforcing means includes an endless belt and means causing said belt to move in a fixed cylindrical path adjacent said meter to produce said convexity.

13. Apparatus according to claim 10, wherein said enforcing means includes a frame, a plurality of small diameter rollers mounted in said frame with their axes parallel and disposed on the arc of a circle having substantially the said radius of curvature, the spacing between said rollers being such that radii of said curvature drawn through axes of adjacent rollers subtend an angle not in excess of 4½°, for producing said convexity.

14. Apparatus according to claim 10, wherein said enforcing means is urged against said positioning rolls by fluid pressure.

References Cited in the file of this patent

UNITED STATES PATENTS

| Re. 22,531 | Hare | Aug. 22, 1944 |
| 2,675,482 | Brunton | Apr. 13, 1954 |